Dec. 24, 1968 O. G. ATTEWELL 3,418,529
CONTROL CIRCUIT FOR PROTECTIVE DEVICE
Filed June 9, 1966
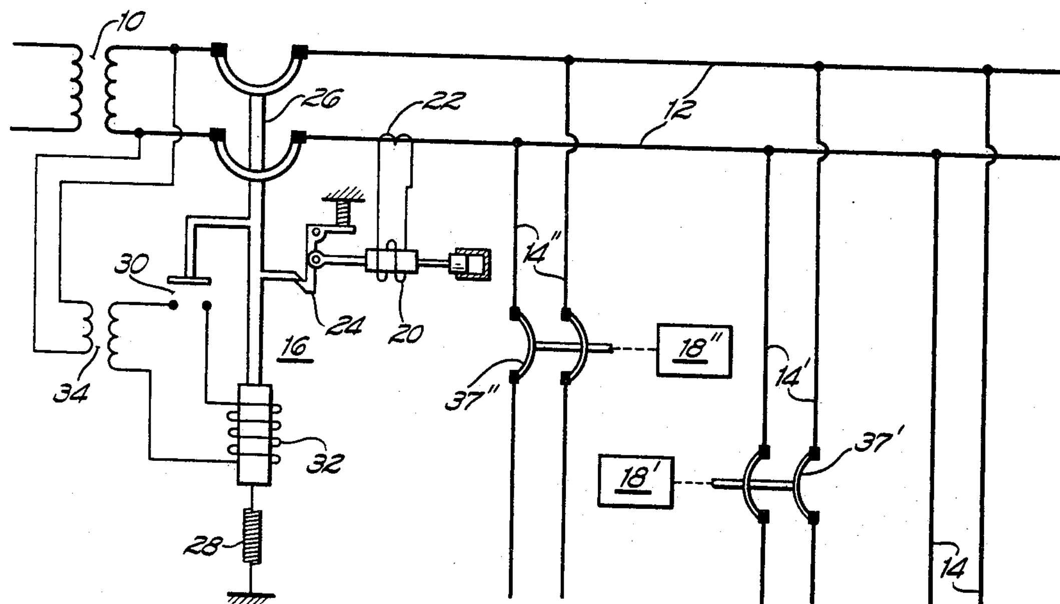
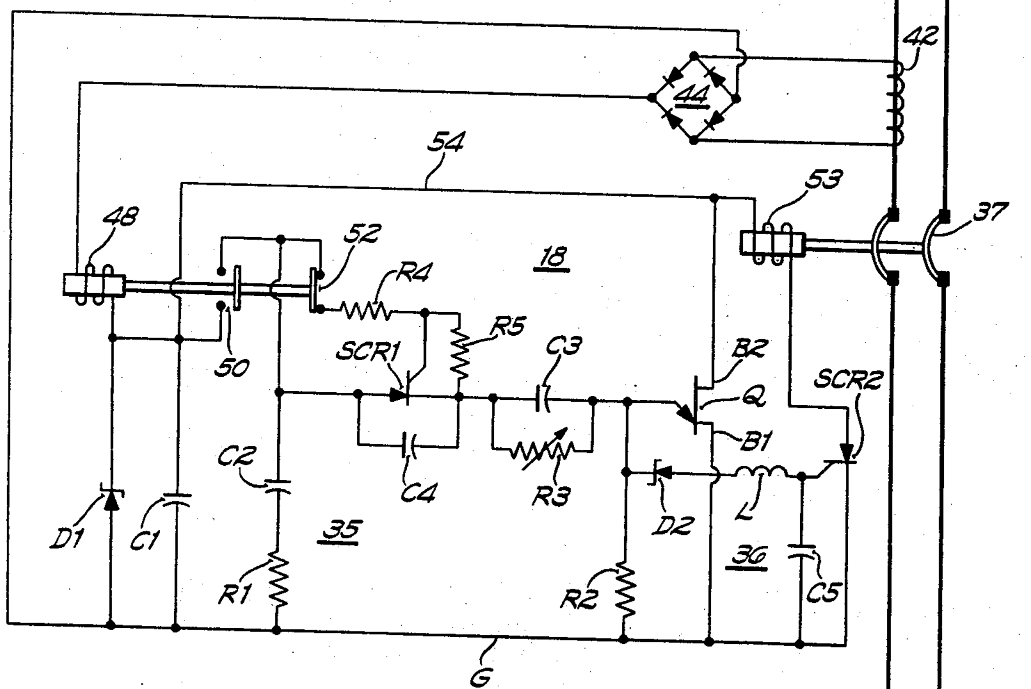
INVENTOR.
Oliver G. Attewell
BY
Fred Wiviott
Attorney United States Patent Office 3,418,529 Patented Dec. 24, 1968

3,418,529

CONTROL CIRCUIT FOR PROTECTIVE DEVICE

Oliver G. Attewell, South Milwaukee, Wis., assignor to McGraw-Edison Company, Milwaukee, Wis., a corporation of Delaware Filed June 9, 1966, Ser. No. 556,316
11 Claims. (Cl. 317—11)

ABSTRACT OF THE DISCLOSURE

A control circuit for an automatic sectionalizing switch having a relay which follows the energy condition of the line in which the switch is connected. When the relay is energized, its contacts are connected to allow charging of an energy storage means. When the relay is deenergized its contacts allow the energy storage means to actuate a switching circuit means. The switching circuit means then conducts charge from the energy storage means to a memory means and continues to do so until the charge on the energy storage and memory means is equal, regardless of bounce of the contacts. This operation is repeated during successive operations of the relay until the memory means accumulates a predetermined charge at which time the potential due to the charge on the storage means acts to initiate opening of the sectionalizing switch.

This invention relates to a control circuit for protective devices and, more particularly, to a control circuit for automatic sectionalizing switches.

It is common practice in distribution systems to coordinate a repeating circuit interrupter, which may be connected in series with the main distribution line and located adjacent the source of power, and sectionalizing switches disposed in feeder lines radiating from the main line. Because the majority of faults in such systems are temporary in nature and will clear in a relatively short time, it is common to adjust the repeating circuit interrupter to execute a series of rapidly successive opening and reclosing operations, during which time the sectionalizer contacts remain closed. If the fault has not cleared after a predetermined number of such opening and reclosing operations, usually three, it is considered permanent, in which case it should be isolated from the source.

If the fault is on one of the feeder lines, the sectionalizer switch in that line will open subsequent to the third opening operation of the circuit interrupter, thereby isolating the fault from the main line. For this purpose, sectionalizer switches are provided with fault integrating means which count the number of fault current impulses and then operate switch opening means to isolate the faulted feeder line from the main line while the circuit to the remaining feeder lines remains intact. The opening of the sectionalizer switch contacts takes place while the repeating circuit interrupter is open, so that the sectionalizer switch is not required to have interrupting capacity. After the sectionalizer switch in the faulted section has opened, the repeating circuit interrupter again recloses to restore service to the nonfaulted feeder lines. If, on the other hand, the permanent fault exists in the main line, the sectionalizer switches will remain inactive while the repeating circuit interrupter cycles to lockout, so that when service is restored in the main line, the feeder lines will be immediately energized.

Some prior art sectionalizing switches, such as that shown in U.S. Patent 3,127,542, employ overload relay means for sensing the appearance and disappearance of fault current and for actuating operation counting means by the opening and closing of relay contacts. Such relays are, however, subject to contact bounce which may cause the operation counting means to read more fault current appearances and disappearances than actually occur.

It is a general object of the invention to provide a new and improved static control for sectionalizing switches.

Another object of the invention is to provide a sectionalizing switch having an overcurrent relay with means for eliminating the effect of relay contact bounce.

These and other objects and advantages of the instant invention will become more apparent from the detailed description thereof taken with the accompanying drawing which schematically illustrates a sectionalizer switch control circuit incorporating the instant invention.

In general terms the invention comprises in a protective device overload relay means operable to move contact means from a first position to a second position upon the occurrence of an overload wherein the contacts are characterized by a tendency to bounce, signal means for producing an electrical signal, operation counting means responsive to a predetermined number of signals for affecting the opening of main switch means, and circuit means operable upon the movement of the contacts into their second position, to couple the signal means to the signal memory and being constructed and arranged to maintain the coupling therebetween until the completion of the signal regardless of contact bounce.

Referring to the drawing in greater detail, an electrical distribution system is illustrated as having a source of power symbolized by a transformer 10, a main line section 12 in series with the source of power and a plurality of feeder lines 14, 14′ and 14″ radiating from the main line. The system also includes a circuit interrupter 16 of the repeating type, which is disposed in the main line 12 adjacent the source of power 10 and sectionalizers 18, 18′ and 18″ which are in feeder lines 14, 14′ and 14″ respectively, adjacent their junctions with the main distribution line 12. Because each of the sectionalizer switches 18, 18′ and 18″ is identical, only 18 is shown in detail for the sake of simplicity, the others merely being shown in symbolic form.

Upon the occurrence of a fault in the main line 12 or one of the feeder lines 14, 14′ or 14″, the trip coil 20 of the repeating circuit interrupter 16, senses the fault through current transformer 22, which couples it to the system 12. After a time delay, the trip coil 20 releases a latch 24 which allows the main switch 26 to open under the influence of an opening spring 28. When the main switch 26 reaches its fully opened position, an auxiliary switch 30 is closed to couple a closing coil 32 to the source side of contacts 26 through a step-down transformer 34, so that the main switch 26 is again reclosed. If the fault has cleared during the opening and reclosing cycle, the main switch 26 will remain closed. If, however, the fault does not clear during this interval, there follows a predetermined number of successive opening and closing operations followed by the locking open of the main switch 26 by a lockout means which is not shown but which is well known in the art.

The details of the automatic circuit interrupter just discussed form no part of the instant invention and therefore has been schematically illustrated and described only in general terms. For a more complete description of a circuit interrupter capable of performing these functions, reference is made to Patent No. 2,926,228 to K. H. Date et al.

Referring now to the sectionalizing switch 18, it is shown to include a control circuit having an integrating portion 35 and an operating portion 36 for actuating the main switch 37. The integrating portion 35 is operable to count the number of appearances and disappearances of overload current and to actuate the operating portion 36 after a predetermined number thereof so that the main switch 37 will open.

The integrating portion 35 includes an energy source capacitor C1 coupled to the feeder line 14 by means of a current transformer 42 and a bridge type rectifier 44. In this manner the rectified current in the secondary of current transformer 42 maintains the energy source capacitor C1 fully charged. In order to limit the voltage across the energy source capacitor C1 to the desired value, it is shunted by a Zener D1 which bypasses the charging current around said capacitor when the latter is fully charged.

The operating coil of an overcurrent relay 48 is connected in series with the charging circuit of the energy source capacitor C1 and includes normally open contacts 50 and normally closed contacts 52.

A transfer capacitor C2 is connected in series with a resistor R1 and the combination is connected in parallel with the energy source capacitor C1 through the normally open contacts 50 of the over-current relay 48. In addition, an integrating capacitor C3 is connected in series with a resistor R2 and the combination is connected in parallel with the series combination of C2 and resistor R1 through the anode and cathode electrodes of silicon controlled rectifier SCR1. An adjustable leakage resistor R3 is connected in shunt with the second integrating capacitor C3. Also, the normally closed contacts of relay 48 connect capacitor C2 to one end of a resistor R4 whose other end is connected to the gate of SCR1 and a second resistor R5 is connected between the gate and collector of SCR1. The anode and cathode of SCR1 is shunted by a capacitor C4.

The operating portion 36 of sectionalizing switch 18 includes a trip coil 53 for opening the main contacts 37 and which is connected in series with the anode and cathode of a second silicon controlled rectifier SCR2 and the series combination is connected in parallel with the energy source capacitor C1 by conductor 54. The operating portion 36 also includes a unijunction transistor Q whose emitter is connected to the junction between the capacitor C3 and resistor R2 and whose base-one electrode B1 and base-two electrode B2 are respectively connected to the ground bus G and conductor 54. In addition, a Zener diode D2 and an inductor L are series connected between the gate electrode of SCR2 and the emitter of unijunction transistor Q. Also, a capacitor C5 is connected between the gate electrode SCR2 and the ground bus G.

Assume for the sake of illustration, that a fault occurs in feeder line 14. This will result in an increased rectified current in the operating coil of relay 48 causing it to close its normally open contacts 50 and open its normally closed contacts 52. This connects the transfer capacitor C2 in parallel with the energy source capacitor C1 so that a portion of the charge on capacitor C1 is redistributed on capacitor C2. Since the fault current also causes the operation of trip coil 20 of recloser 16, the main switch 26 is opened after a time delay to interrupt the current in the main distribution line 12 and the feeder lines 14, 14′ and 14″. However, because the opening of the contacts 26 of circuit breaker 16 is time delayed, sufficient time is available for capacitor C2 to continue charging until the voltage across it and capacitor C1 are equal.

When the main contacts 26 of repeating circuit interrupter 16 open, relay 48 drops out, opening contacts 50 to isolate capacitor C2 from capacitor C1 and closing contacts 52. This causes a small current flow through R4 to provide a gate signal to SCR1 which then turns on so that capacitor C2 and C3 are connected in series.

When SCR1 becomes conductive, a voltage is placed across the emitter-base-one circuit of unijunction transistor Q and across resistor R2 which is equal to the difference between the voltages across capacitors C2 and C3. Upon the initial operation of the sectionalizer 18, the charge on capacitor C3 will be substantially zero the entire voltage across capacitor C2. As a result, the voltage across the emitter-base-one of unijunction transistor Q will be substantially equal to that across capacitor C2.

It will be appreciated too that the potential across the base-one base-two circuit of unijunction transistor Q will be equal to the voltage across energy storage capacitor C1. The capacitances of capacitors C1, C2 and C3 will be chosen so that during the initial operation, the voltage impulse across resistor R2 will be sufficiently large to cause unijunction transistor Q to break down and conduct emitter-base-one current, thus completing the charging circuit between capacitors C2 and C3. If the magnitude of the voltage impulse across resistor R2 is sufficiently high to cause emitter-base-one current to flow in unijunction transistor Q, this voltage pulse will be short-lived. Inductor L appears as a high impedance to a voltage pulse of short duration and capacitor C5 appears as a low impedance to such a voltage impulse so that very little charge will accumulate on capacitor C5.

As those skilled in the art will appreciate, a silicon controlled rectifier is a device which, once being rendered conductive, will remain conductive as long as anode current continues to flow regardless of the disappearance of its gate signal. As a result, once current begins flowing from capacitor C2 through SCR1 to capacitor C3, this current flow will continue until capacitor C3 receives a full portion of the charge from capacitor C2 regardless of the opening and closing of contacts 52 as a result of contact bounce. Thus, once an integrating operation begins, it will not be interrupted or otherwise affected by contact bounce. The proportion of the charge on capacitor C2 that will flow to capacitor C3 will, of course, depend upon the relative sizes of the capacitors and the initial charge appearing on each.

Should the fault in feeder line 14 clear while the main contacts 26 of repeating circuit interrupter 16 are open, the latter will remain closed upon subsequent reclosure. The charge on capacitors C2 and C3 will then slowly leak off through a path defined by resistors R1, R2, R3, R4 and R5 and the rate of this leakage may be adjusted by the adjustment of resistor R3.

On the other hand, should the fault in feeder line 14 persist upon the reclosing of the main contacts 26 of circuit interrupter 16, relay 48 will again pull in, closing contacts 50 and opening contacts 52. Once again, some of the charge on capacitor C1 will flow to capacitor C2 until the voltage across the two is equal. This fault current will also actuate relay 20 which, after a time delay, will release the main contacts 26 of circuit interrupter 16 for movement to their open position under the influence of spring 28. This causes relay 48 to drop out, thereby opening contacts 50 to disconnect capacitors C1 and C2 and closing contacts 52 to render SCR1 conductive to connect capacitors C2 and C3. The instantaneous voltage across the emitter-base-one circuit of unijunction transistor Q will again be equal to the difference between the voltages across capacitors C2 and C3. If it is desired to have the sectionalizer switch open after three operations of the reclosing circuit interrupter 16, unijunction transistor Q will again break down to complete the charging circuit between capacitors C2 and C3. As a result a second quantity of charge will flow from capacitor C2 to capacitor C3 in the manner described above so that capacitor C3 will now have a relatively large percentage of its full charge.

The contacts 26 of repeating circuit interrupter 16 will again close after a time delay and assuming that the fault persists it will cause the operation of relay 48 to connect capacitors C1 and C2. In addition, after a time delay, the fault current will be interrupted by the repeating circuit interrupter 16 whereupon relay 48 will drop out to again render SCR1 conductive thereby to connect capacitors C2 and C3.

It will be recalled that the sectionalizer 18 is constructed and arranged to become operative after three opening operations of the repeating circuit interrupter 16. As a result the parameters of the integrating circuit 35 and the switching circuit 36 are so chosen that after the third operation of the relay 48, the difference in the voltages across capacitors C2 and C3 will be relatively small as a result, the instantaneous voltage across the emitter-base-one circuit of unijunction transistor Q will be insufficient to cause it to conduct emitter-base-one current. Upon this event, a continuous voltage will appear across resistor R2 so that capacitor C5 will charge to a relatively high level. This provides a gate signal to SCR2 which becomes conductive to complete an energizing circuit from the energy source capacitor C1 through the trip coil 53 which, in turns, opens the main switch 37.

Resistor R5 provides a path for leakage current around SCR1 to prevent it from being turned on as a result of leakage current which may occur at high temperature. The capacitor C4 which shunts the anode and cathode of SCR1 prevents the latter from turning on prior to the gate signal as a result of a rapid voltage rise which may occur thereacross as a result of the closing of contacts 50. Zener diode D2 serves to keep the relatively small forward voltage drop across unijunction transistor Q, which occurs when the latter is in its conductive state, from charging capacitor C5.

It will be appreciated that the operation of the trip coil 53 occurs only after the main contacts of the circuit interrupter 16 have opened. More specifically, only upon the disappearance of the fault current resulting from the opening of contacts 26 of circuit interrupter 16, is relay 48 released to connect the capacitors C2 and C3 and thereby place the necessary voltage across capacitor C5 to actuate SCR2. This is necessary because the contacts 37 of sectionalizer 18 have no fault current interrupting capacity and therefore open only when there is no current flowing in feeder line 14.

The opening of main switch 37 isolates the fault in feeder line 14 so that upon the subsequent reclosing of the main contacts 26 of circuit interrupter 16, current conditions in the system will have returned to normal so that contacts 26 will not re-open and continuous service will be resumed in the main line 12 and the other feeder lines 14′ and 14″.

It can be seen that because sectionalizer switch 18 is operative only upon the occurrence of a fault in feeder line 14 which is necessary to actuate relay 48, its main switch 37 will remain closed should a permanent fault occur in the main distribution line 12 or in one of the other feeder line 14′ or 14″. As a result, if a permanent fault appears in the main line 12 or in one of the other feeder line 14′ or 14″, service will be restored in the feeder line 14 as soon as the fault in the main line 12 is cleared or as soon as the fault in the other feeder lines is isolated.

It will also be appreciated that the number of fault current impulses which the sectionalizer 18 will integrate before its main contacts 37 are opened, will be determined by the parameters of the integrating circuit 35 and the operating circuit 36 and are not limited to the number discussed hereinabove for the purposes of illustration.

While only a single embodiment of the invention has been shown and described, it is not intended to be limited thereby but only by the scope of the appended claims.

I claim:

1. In a protective device having main switch means the combination of, overload relay means coupled to said main switch means and including contact means having two positions, at least one of said positions being closed, said overload relay means being operable to move said contact means from the closed position to the other position upon each occurrence of an overload in said main switch means, said contact means being characterized by a tendency to bounce, first means for producing electrical signals, signal memory means responsive to a predetermined number of said signals for effecting the opening of said main switch means, second means coupled to said contact means and operable upon each movement thereof into said closed position to couple said first means to said signal memory means so that a signal may be received thereby and being constructed and arranged to maintain the coupling therebetween regardless of the bouncing of said contact means.

2. The protective device set forth in claim 1, wherein said second means comprises switching circuit means in circuit between said first means and said signal memory means and having control means coupled to said contact means, said switching circuit means being rendered operative to couple said first means and said signal memory means in response to the moving of said contact means into its closed position.

3. The protective device set forth in claim 1, wherein said relay means is operative to return said contact means to its closed position when said overload in said system disappears, said second means being operative in response to the returning of said contact means to its closed position, and output means coupled to said signal memory means and to said main switch means and responsive to the receipt of a predetermined number of signals by said signal memory means to open said main switch means.

4. The protective device set forth in claim 3, wherein said second means comprises switching circuit means in circuit between said first means and said signal memory means and having control means, said contact means being in circuit between said control means and said first means, said switching circuit means being rendered operative to couple said first means and said signal memory means in response to the returning of the contact means to its closed position.

5. The protective device set forth in claim 4, wherein said first means comprises first energy storage means and said signal memory means comprises second energy storage means, said switching circuit means transferring a quantity of energy from said first energy storage means to said second energy storage means each time said contact means moves into its closed position, said output means opening said main switch means after a predetermined quantity of energy is received by said second energy storage means.

6. The protective device set forth in claim 2, wherein said control means is electrically isolated from first means when said contact means is in the other of its positions and electrically connected to said first means when said contact means is in its closed position whereby said switching circuit means is rendered operative by the control means.

7. In a protective device having main switch means the combination of, overload relay means coupled to said main switch means and having contact means, said overload relay means being operable to move said contact means from a first position to a second position upon each occurrence of an overload in said main switch means, said contact means being characterized by a tendency to bounce, first means for producing electrical signals, signal memory means responsive to a predetermined number of said signals for effecting the opening of said main switch means, second means responsive to the movement of said contact means into a predetermined one of its positions to electrically connect said first means to said signal memory means so that a signal may be received thereby, said second means being the sole electrical connection positioned between said first means and said signal memory means and being constructed and arranged to maintain the electrical connection therebetween regardless of the bouncing of said contact means.

8. The protective device set forth in claim 7, wherein said predetermined one of the positions of said contact means is a closed position and said second means is responsive to the movement of said contact means into said closed position to electrically connect said first means to said signal memory means.

9. The protective device set forth in claim 7, wherein said first position is the predetermined one of the positions of said contact means, said second means comprises switching circuit means in circuit between said first means and said signal memory means and having control means coupled to said contact means, said control means being electrically isolated from said first means when said contact means is in its second position and electrically connected to said first means when said contact means is in its first position, whereby said switching circuit means is actuated to electrically connect said first means to said signal memory means.

10. The protective device set forth in claim 9, wherein said first means comprises energy storage means for actuating said switching circuit means when electrically connected to said control means.

11. In a protective device having main switch means the combination of, overload relay means coupled to said main switch means and having contact means, said overload relay means being operable to move said contact means from a first position to a second position upon each occurrence of an overload in said main switch means, said contact means being characterized by a tendency to bounce, first means for producing electrical signals, signal memory means responsive to a predetermined number of said signals for effecting the opening of said main switch means, second means in circuit between said first means and said signal memory means and having control means coupled to said contact means, said control means being electrically isolated from said first means when said contact means is in its second position and electrically connected to said first means when said contact means is in its first position to actuate said second means and electrically connect said first means to said signal memory means so that a signal may be received thereby, said second means being constructed and arranged to maintain the electrical connection therebetween regardless of the bouncing of said contact means.

References Cited

UNITED STATES PATENTS

| | | | |
|---|---|---|---|
| 2,157,925 | 5/1939 | Stoddard | 317—11 |
| 3,255,384 | 6/1966 | Riebs | 317—22 |
| 3,339,110 | 8/1967 | Jones | 317—11 |

JOHN F. COUCH, *Primary Examiner.*

J. D. TRAMMELL, *Assistant Examiner.*

U.S. Cl. X.R.

317—22, 33, 148.5; 200—166